(12) United States Patent
Mori

(10) Patent No.: US 6,411,400 B1
(45) Date of Patent: Jun. 25, 2002

(54) DATA PROCESSING APPARATUS, DATA PROCESSING METHOD THEREFOR, AND STORAGE MEDIUM FOR STORING COMPUTER-READABLE PROGRAM

(75) Inventor: Yasuo Mori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/353,022

(22) Filed: Jul. 13, 1999

(30) Foreign Application Priority Data

Jul. 14, 1998 (JP) .......................................... 10-198218
May 28, 1999 (JP) .......................................... 11-149485

(51) Int. Cl.[7] ............................................. G06K 15/00
(52) U.S. Cl. ...................................................... 358/1.2
(58) Field of Search ........................ 358/1.1, 1.2, 1.13, 358/1.15, 1.18, 528, 537, 540, 449, 450, 451, 452; 345/660, 472; 707/517, 520, 525, 539; 382/298, 299

(56) References Cited

U.S. PATENT DOCUMENTS 5,301,036 A * 4/1994 Barrett et al. ................ 345/656
5,995,719 A * 11/1999 Bourdead'hui et al. ..... 358/1.12

* cited by examiner

*Primary Examiner*—Arthur G. Evans
(74) *Attorney, Agent, or Firm*—Fitzpatrick, Cella, Harper & Scinto

(57) ABSTRACT

The objective of the present invention is to desirably prepare a printing environment wherein a blank space can be externally attached to print data at a printer driver level. And when the printing of data generated by an application is requested, a despooler reduces the size of the print data based on blank space information set by a printer driver, and generates layout data whereby a blank space is externally attached to the resultant print data.

34 Claims, 15 Drawing Sheets

ORIGINAL PRINT DATA

PRINT WITH BLANK SPACE

FIG. 16

```
PRINT DATA PRINT DATA PRINT
DATA PRINT DATA PRINT DATA
PRINT DATA PRINT DATA PRINT
DATA PRINT DATA PRINT DATA
PRINT DATA PRINT DATA PRINT
DATA PRINT DATA PRINT DATA
PRINT DATA PRINT DATA PRINT
DATA PRINT DATA PRINT DATA
PRINT DATA PRINT DATA PRINT
DATA PRINT DATA PRINT DATA
PRINT DATA PRINT DATA PRINT
```
(CONFIDENTIAL watermark overlaid diagonally)

FIG. 17

SET BLANK SPACE

| BASIC | DETAIL |

CHK301 — ☐ PRINT ADDITIONAL INFORMATION IN BLANK SPACE

FIG. 21

MEM MAP OF MEM MEDIUM

| DIRECTORY |
|---|
| FIRST DATA PROCESSING PROGRAM<br>PROGRAM CODES FOR FLOWCHART OF FIG. 7 |
| SECOND DATA PROCESSING PROGRAM<br>PROGRAM CODES FOR FLOWCHART OF FIG. 8 |
| THIRD DATA PROCESSING PROGRAM<br>PROGRAM CODES FOR FLOWCHART OF FIG. 15 |
| FOURTH DATA PROCESSING PROGRAM<br>PROGRAM CODES FOR FLOWCHART OF FIG. 20 |

DATA PROCESSING APPARATUS, DATA PROCESSING METHOD THEREFOR, AND STORAGE MEDIUM FOR STORING COMPUTER-READABLE PROGRAM

BACKGROUND OF THE INVENTION

1. Field of the Invention

The present invention relates to a data processing apparatus and to a data processing method for transmitting print data having externally attached blank space to a printing apparatus which can communicate through a predetermined communication medium, and to a storage medium for storing a computer-readable program used to perform the data processing method.

2. Related Background Art

Some conventional presentation software that is activated by a data processing apparatus includes a printing function, which is called a distributed reference printing function, for adding space for notes or comments.

An example of such a printing function divides one page into 2*3=6 segments, and enters print data in three locations while leaving the other three locations blank for use for notes.

However, this example function is executed at an application level. In addition to this function, there is a marginal printing technique that is used by a printer, or at a printer driver level, for processing print data so as to add blank space.

However, since printing for which both print data and blank space are ensured can not be performed by a printer, or at a printer driver level, blank space having an arbitrary size can not be provided in a layout for print data received from an arbitrary application, and only the space provided for the margins surrounding a printed area are available for use for notes. Therefore, when a user wishes to print reference material that has been received and takes notes while listening to an explanation given for the reference material, he or she must use a note pad. Accordingly, the user will end up with two separate sets of reference materials, and as a result, if not careful, may lose the written notes for the variable information he or she has recorded.

Further, the margins of recording sheets are used as space in which to punch holes or to staple sheets together for filing, while no consideration is given to acquiring blank space in which comments can be added for print data. Thus, if this function is employed for an application, printing results can not be obtained in which a blank space desired by a user is externally added to the layout of generated print data.

SUMMARY OF THE INVENTION

To resolve the above shortcoming, it is one objective of the present invention to provide a data processing apparatus and a data processing method for transmitting, to a printing apparatus, a print data layout to which blank spaces having desired forms are externally added, without depending on a function performed by an application, and for arbitrarily establishing a printing environment in which blank spaces can be externally added to print data at a printer driver level, and to provide a storage medium for storing a computer-readable program.

To achieve the above objective, according to the present invention, an information processing apparatus, for employing drawing data received from an application to generate print data that are to be output to a printing apparatus, comprises:

blank space setting means for preparing blank space information for adding desired blank space to the drawing data;

processing means for calculating a magnification ratio for the drawing data based on the blank space information that is set by the blank space setting means and using the magnification ratio to change the size of the drawing data; and layout means for laying out drawing data, obtained by the processing means, in accordance with the blank space information prepared by the blank space setting means, and for generating print data.

BRIEF DESCRIPTION OF THE DRAWINGS

FIG. 16 is a specific diagram showing an example output, by the data processing apparatus according to the present invention, in which additional data and print data are synthesized;

FIG. 17 is a diagram showing an example blank space information designation dialogue box for a data processing apparatus according to a fourth embodiment of the present invention;

FIG. 21 is a diagram for explaining a memory map, on a storage medium on which various data processing programs are stored, that can be read by a printing system for which the data processing apparatus of the present invention can be applied.

DETAILED DESCRIPTION OF THE PREFERRED EMBODIMENTS

Before an explanation of the preferred embodiments of the present invention is given, the arrangement of a printing apparatus for which the present invention can be applied will be described.

Figure 1:
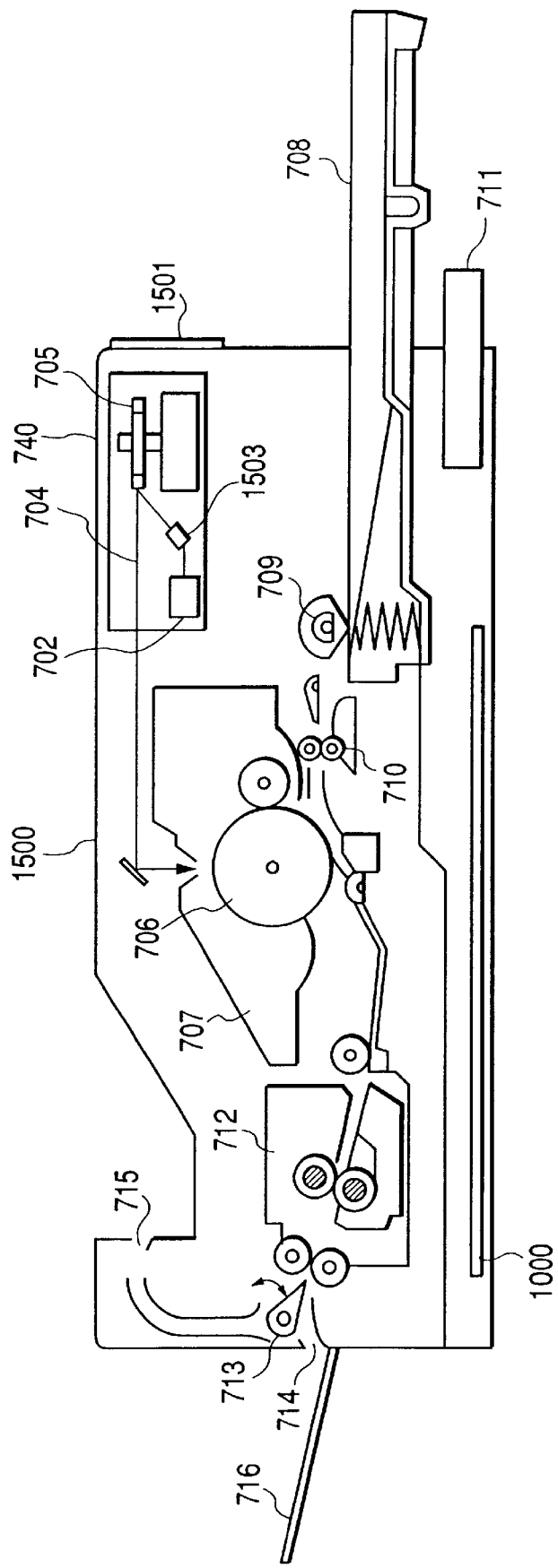
FIG. 1 is a schematic cross-sectional view of the arrangement of a printing system that can communicate with a data processing apparatus according to the present invention.

FIG. 1 is a schematic cross-sectional view of the arrangement of a printing apparatus that can communicate with a data processing apparatus according to the present invention. The printing apparatus corresponds, for example, to a laser beam printer 1500 (hereinafter referred to as an LBP).

In the LBP (hereinafter referred to as a printer) 1500, keys used for setting various print modes and a display indicating the printing state are provided on an operation panel 1501. A printer control unit 1000, which includes a CPU, a RAM and a ROM, analyses a printer control command received from a host computer, converts it into a video signal, and transmits the video signal to a laser driver 702.

A semiconductor laser 703, which is turned on or off by the laser driver 702, emits a laser beam 704 in accordance with appropriate print data. A polygon mirror 705 deflects the laser beam 704 emitted by the semiconductor laser 703 so that it scans a photosensitive drum 706 in the primary scanning direction. Thereafter, a replaceable developing unit 707 employs a developer to develop an electrostatic latent image that is formed on the photosensitive drum 706, and the obtained toner image is transferred to a cut sheet that is fed from a sheet cassette 708 and conveyed to the photosensitive drum 706. Then, under pressure and heat applied by a fixing unit 712, the toner image is thermally fixed to the cut sheet and a permanent image is produced.

A direction flapper 713 controls the direction in which the cut sheet is discharged after the fixing process has been completed, guiding it either to a discharge port 704 or to a discharge port 715. A discharge sheet tray 716 is provided on which cut sheets to which the toner image has been fixed are stacked face up.

The structures and operations of the individual sections will now be described in detail. The printer control unit 1000 controls the overall operation of the printer 1500, and analyzes character pattern information. Primarily, the printer control unit 1000 converts a printer control command into a video signal that it transmits to the laser driver 702. An external memory 711 can be connected to the printer control unit 1000 to supply font data and an emulation program for a page description language. Operating switches and display means (e.g., an LED) are provided on the operation panel 1501, as is described above.

The laser driver 702, a circuit for driving the semiconductor laser 703, employs a received video signal to turn on or off the laser beam 704 emitted by the semiconductor laser 703. The laser beam 704, which is emitted by the semiconductor laser 703, is directed toward the polygon mirror 705 where it is split equally. The laser beam 704 is then used to scan the photosensitive drum 706 and to form on the photosensitive drum 706 an electrostatic latent image of a character pattern.

The developing unit 707, which is located on the periphery of the photosensitive drum 706, develops the electrostatic latent image, following which the developed image is transferred to a recording sheet. Cut sheets, which are stored as recording sheets in the sheet cassette 708, are extracted individually from the sheet cassette 708 by a feed roller 709, and are fed into the printer 1500 by conveyer rollers 710 and delivered to the photosensitive drum 706. Cut sheets can also be fed from a manual feeding tray that is provided above the lid of the sheet cassette 708.

The fixing unit 712 applies pressure and heat to the toner image transferred to the cut sheet and thermally fixes it thereto. When the direction flapper 713 is set in the up position, the recording sheet bearing the image is discharged from the face-up discharge port 714 to the discharge tray 716 with its recorded face up. When the direction flapper 713 is set in the down position, the recording sheet bearing the image is discharged from the face-down discharge port 715 with its recorded face down.

So long as the function of the present invention is implemented, the present invention can be applied for a single apparatus, a system including a plurality of apparatuses, or a processing system connected to a network, such as a LAN (Local Area Network) or a WAN (Wide Area Network).

First Embodiment

Figure 2:
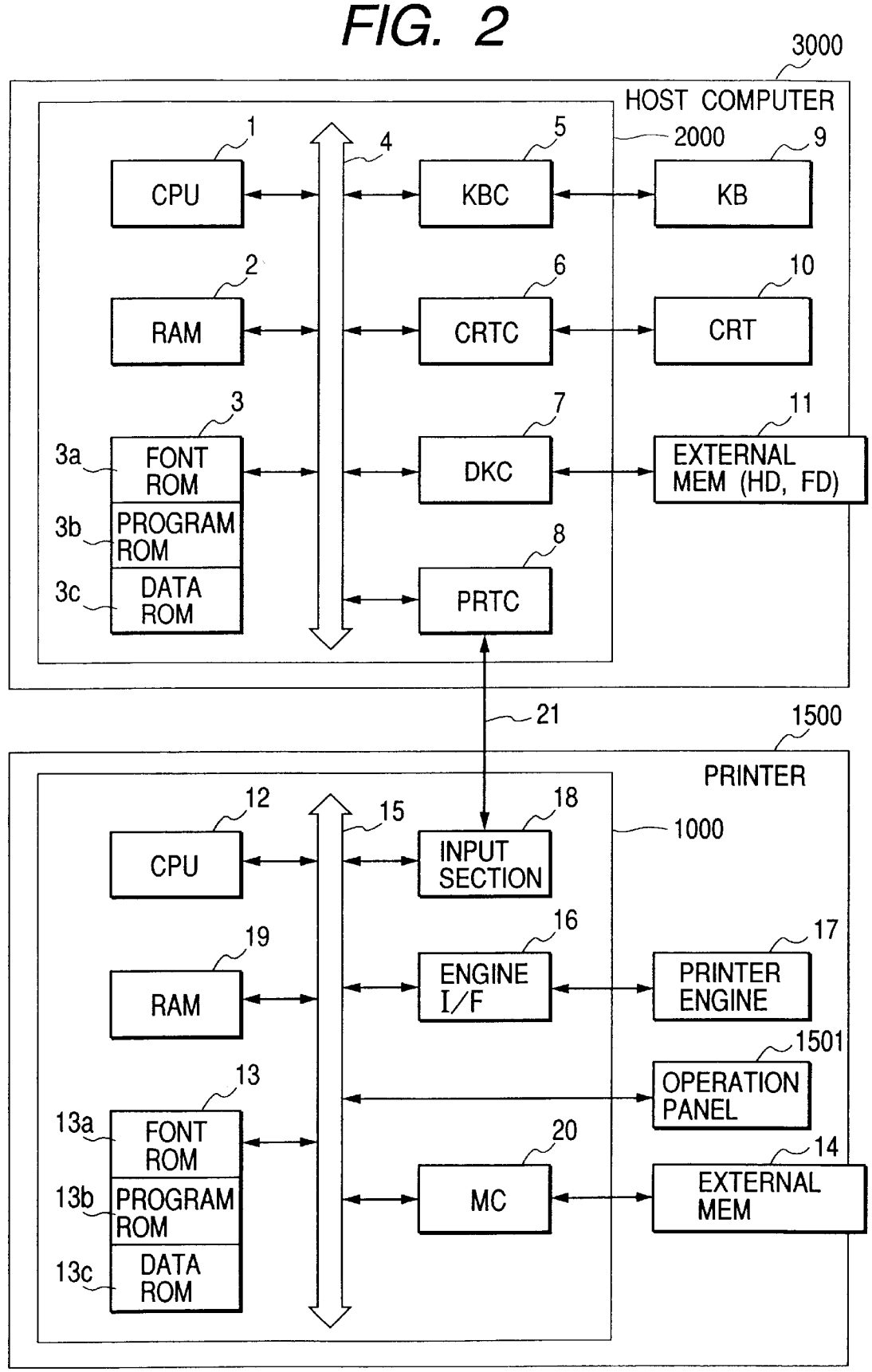
FIG. 2 is a block diagram for explaining the arrangement of a printing system for which a data processing apparatus according to a first embodiment of the present invention can be applied.

FIG. 2 is a block diagram illustrating the arrangement of a printing system for which a data processing apparatus according to a first embodiment of the present invention can be applied. The system corresponds to one in which a printer 1500, which includes a printing control apparatus, and a host computer 3000, which functions as a data processing apparatus, can communicate with each other across a predetermined communication medium.

In the host computer 3000, a CPU 1 controls the individual devices connected to a system bus 4. Also, in accordance with a document process program stored in a program ROM 3b (which will be described later) in the ROM 3 or in external memory 11, the CPU 1 processes documents in which graphics, pictures, characters and tables (to include the calculations for tables) coexist.

In addition, the CPU 1 develops (rasterizes) an outline font in display data RAM located in the RAM 2, for example, to provide for a CRT 10 a WYSIWYG (What You See Is What You Get) function (a function for using data to display on the CRT 10 characters having the same sizes and shapes as they will have when printed).

Furthermore, the CPU 1 opens various registered windows in accordance with commands entered using a mouse cursor (not shown) displayed on the CRT 10, and executes various data processes. When a user employs the printer 1500, he or she can open a printing setup window on the CRT 10 to select a printing method to be used by a printer driver, to include the setting up of the printer 1500 and the selection of a print mode.

The extendable RAM 2 serves as a main memory and a work area for the CPU 1. The ROM 3 includes a font ROM 3a, the program ROM 3b, and a data ROM 3c. The font ROM 3a or the external memory 11 is used to store font data that are employed for document processing.

The program ROM 3b or the external memory 11 is used to store an operating system (hereinafter referred to as an OS), a control program for the CPU 1. And the data ROM 3c or the external memory 11 is used to store various types of data that are used for document processing.

A keyboard controller (KBC) 5 controls the key entry process at a keyboard (KB) 9 or the use of a pointing device (not shown). A CRT controller (CRTC) 6 controls the display on the CRT 10. And a disk controller (DKC) 7 controls the access to the external memory 11.

A printer controller (PRTC) 8 is connected via a bi-directional interface 21 to the printer 1500 and communicates with the printer 1500. And a variety of keys are provided on the keyboard 9.

The CRT 10 is used to display graphics, characters and tables. And the external memory 11, which is constituted by a hard disk (HD) or a floppy disk (FD), is used to store a boot program, various applications, font data, user files, an editing file, and a printer control command generation program (hereinafter referred to as a printer driver).

The above described CPU 1, RAM 2, ROM 3, keyboard controller (KBC) 5, CRT controller (CRTC) 6, disk controller (DKC) 7, and printer controller (PRTC) 8 are located in a computer control unit 2000.

In the printer 1500, a CPU 12 controls the individual devices connected to a system bus 15. Also, as print information, the CPU 12 transmits to a printing unit (printer engine) 17 an image signal prepared in accordance with a control program stored in a program ROM 13b (which will be described later) in the ROM 13 or in an external memory 14.

In addition, to transmit information from the printer 1500 to the host computer 3000, the CPU 12 can communicate with the host computer 3000 via an input section 18.

A RAM 19 serves as a main memory and a work area for the CPU 12, and its memory capacity can be extended by an optional RAM (not shown) that is connected to an extension port. The RAM 19 is used as an output data development area, an environment data storage area, or an NVRAM.

The ROM 13 includes a font ROM 13a, the program ROM 13b, and a data ROM 13c. The font ROM 13a is used to store the font data that are employed to generate the above described output data.

The program ROM 13b is used to store a control program for the CPU 12. And the data ROM 13c is used to store information used by the host computer 3000 when the external memory 14, such as a hard disk, is not connected to the printer 1500.

The input section 18 transmits data, via the bidirectional interface 21, from the printer 1500 to the host computer 3000, or vice versa. A printer engine interface (I/F) 16 is used by the CPU 12 and the printer engine 17 for the exchange of data. A memory controller (MC) 20 controls the access to the external memory 14. And the printer engine 17 prints data under the control of the CPU 12.

The operation panel 1501 includes switches for various operations and display means (e.g., an LED), as is described above.

The external memory 14 is constituted by a hard disk or an IC card, and is connected as an optional component to the printer 1500. This external memory 14, which is used to store font data, an emulation program and form data, is accessed by the memory controller (MC) 20.

It should be noted that there is no limitation on the number of external memories 14 that can be used, and a plurality of external memories 14 can be provided. That is, the printing system may be so designed that it can be connected to a plurality of external memories in which optional fonts in addition to built-in fonts or a program for interpreting different printer control languages are stored. In addition, the printing system may include an NVRAM (not shown) for the storage of print mode setup information received from the operation panel 1501.

The above described CPU 12, RAM 19, ROM 13, input section 18, printer engine interface (I/F) 16, and memory controller (MC) 20 are located in a printer control unit 1000.

Figure 3:
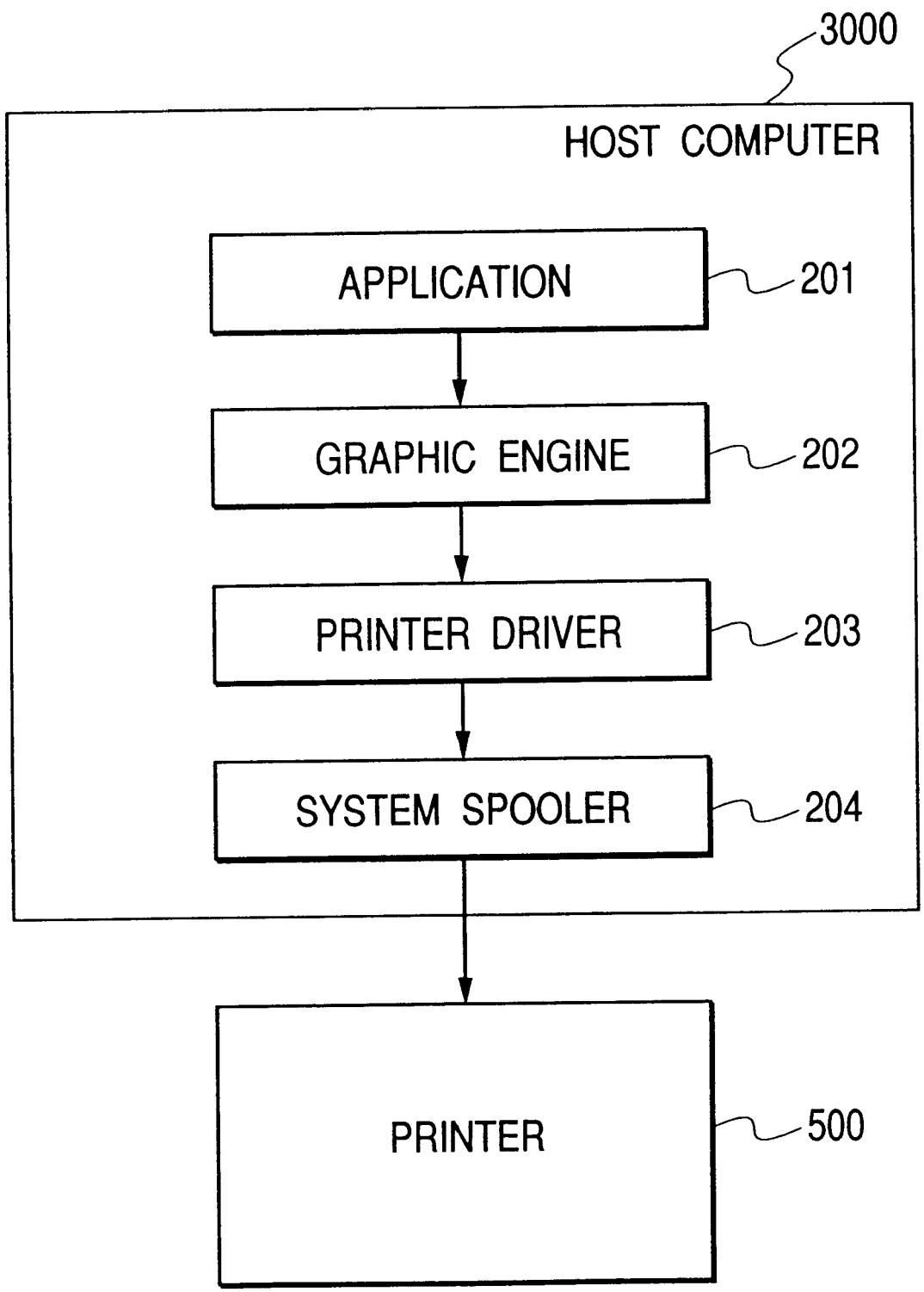
FIG. 3 is a block diagram for explaining the structure of program modules for a host computer shown in FIG. 2.

FIG. 3 is a block diagram for explaining the structure of program modules used for the host computer 3000 in FIG. 2. The same reference numerals as are used in FIG. 2 are also employed in FIG. 3 to denote corresponding components.

In FIG. 3, an application 201 from the external memory 11 is loaded into the RAM 2 and is executed by the CPU 1. A graphic engine 202 also loads a printer driver 203, one of which is prepared for each printer, from the external memory 11 to the RAM 2, and employs the printer driver 203 to convert the output of the application 201 into printer control commands.

The printer driver 203 from the external memory 11 is loaded into the RAM 2 and is executed by the CPU 1. And a system spooler 204 manages the print data that are to be transmitted to the printer 1500.

The modules 201 to 204 are present as files stored in the external memory 11 in FIG. 1, and are loaded into the RAM 2 by an OS or a module that employs those modules.

The application 201 and the printer driver 203 can be added to an FD or a CD-ROM (not shown) via a network (also not shown) as the external memory 11, or to an HD as the external memory 11.

The application 201 stored in the external memory 11 is loaded into the RAM 2 and is executed. However, when the application 201 permits the printer 1500 to print data, the graphic engine 202, which is also loaded into the RAM 2 for execution, is employed to output (draw) data.

The graphic engine 202 loads the printer driver 203, which is prepared for each printer, from the external memory 11 into the RAM 2, and employs the printer driver 203 to convert the output of the application 201 into printer control commands. The printer control commands are transmitted via an interface 21 from the system spooler 204, which is loaded into the RAM 2 by the OS, to the printer 1500.

Figure 4:
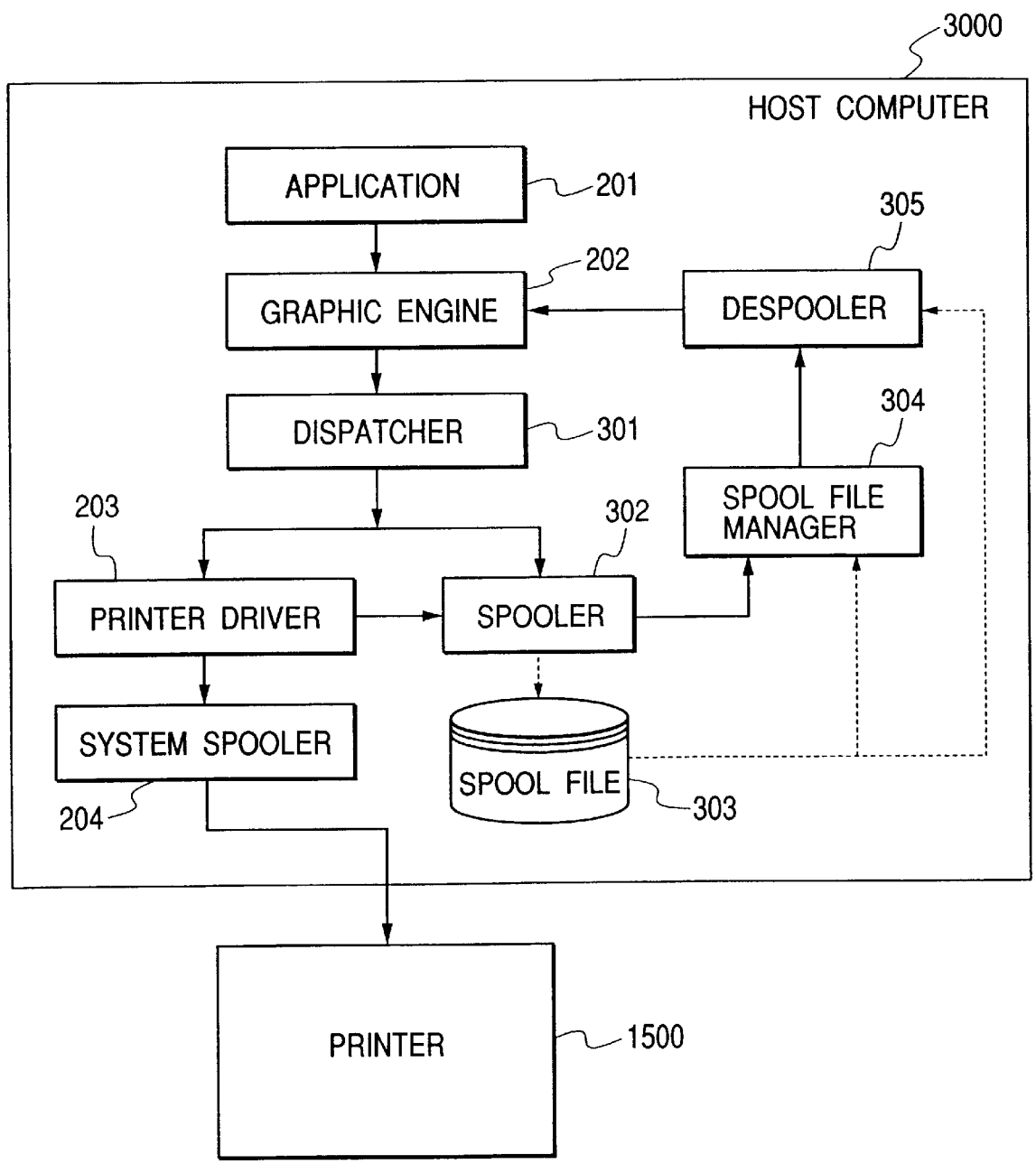
FIG. 4 is a block diagram for explaining the structure of program modules for a host computer shown in FIG. 3.

The printing system in the first embodiment includes not only a printing system constituted by the printer 1500 and the host computer 3000, shown in FIGS. 2 and 3, but also an arrangement by which print data from the application are temporarily spooled as intermediate code data, as is shown in FIG. 4.

FIG. 4 is a block diagram showing the structure of program modules for the host computer 3000 in FIG. 3. The same reference numerals as are used in FIGS. 2 and 3 are also employed in FIG. 4 to denote corresponding components, and the system in FIG. 4 is an extension of system provided for the host computer 3000 in FIG. 3. When a print command is transmitted from the graphic engine 202 to the printer driver 203, a spool file 303 constituted by intermediate code is temporarily generated.

In the system in FIG. 3, the application 201 is released from the printing process when the printer driver 203 has converted all the print commands from the graphic engine 202 into control commands for the printer 1500.

However, in the system in FIG. 4, the application 201 is released from the printing process when a spooler 302 has converted all the print commands into intermediate code data and has output them to the spool file 303. Generally, the execution time required for this process is shorter than is that required for the previously described process. Thereafter, in the system in FIG. 4, the contents of the spool file 303 are processed.

Therefore, a function that the application does not have, such as magnification or Nin1 printing whereby a plurality of pages are printed a single sheet, can be performed for print data received from the application.

For this reason, the system in FIG. 3 is expanded so that it can spool print data using the intermediate code data shown in FIG. 4. It should be noted that a window provided by the printer driver 203 is generally employed to process print data, and that the printer driver 203 stores the setup in the RAM 2 or in the external memory 11. The arrangement in FIG. 4 will now be described in detail.

In the expanded printing system shown in FIG. 4, a dispatcher 301 receives a print command from the graphic engine 202. When the print command from the graphic engine 202 that is received by the dispatcher 301 is the one that is issued to the graphic engine 202 by the application 201, the dispatcher 301 loads the spooler 302 from the external memory 11 to the RAM 2, and transmits the print command to the spooler 302 instead of to the printer driver 203.

The spooler 302 converts the received print command into intermediate code, and transmits the intermediate code to the spool file 303 that is provided in the external memory 11.

The spooler 302 also obtains, from the printer driver 203, the setup for the processing of print data and stores it in the spool file 303. While in this embodiment the spool file 303 is prepared in the external memory 11, it may be prepared in the RAM 2.

In addition, the spooler 302 loads a spool file manager 304 from the external memory 11 to the RAM 2, and notifies the spool file manager 304 of the preparation situation as it applies to the spool file 303.

Then, the spool file manager 304 determines whether printing can be performed in accordance with the setup for processing print data that is stored in the spool file 303. When the spool file manager 304 determines that printing can be performed by using the graphic engine 202, a despooler 305 from the external memory 11 is loaded into the RAM 2, and is instructed to print the intermediate code stored in the spool file 303.

The despooler 305 then processes the intermediate code, which is included in the spool file 303, in accordance with the processing setup stored in the spool file 303, and via the graphic engine 202, again outputs the results to the dispatcher 301. If the print command received by the dispatcher 301 from the graphic engine 202 is the one that was issued by the despooler 305 to the graphic engine 202, the dispatcher 301 transmits the print command to the printer driver 203, instead of to the spooler 302. The printer driver 203 then generates a printer control command, and outputs it to the printer 1500 via the system spooler 204.

Figure 5:
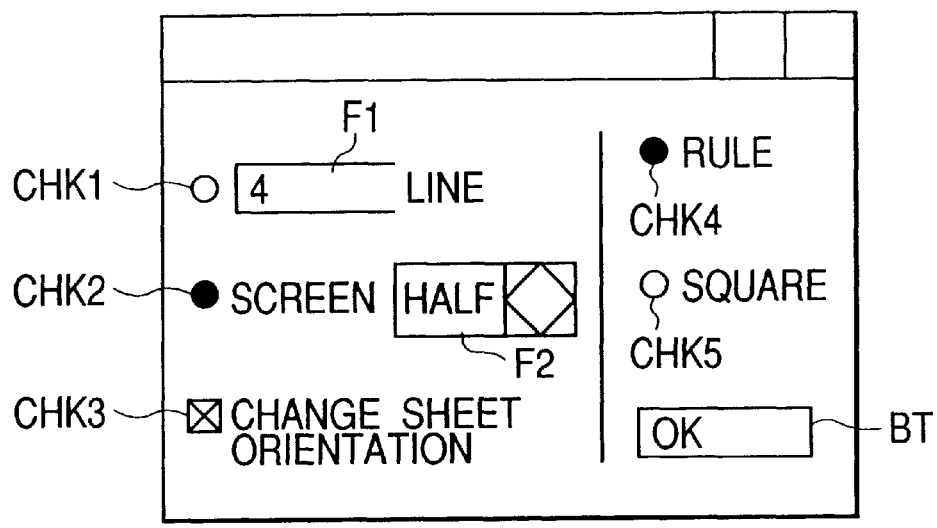
FIG. 5 is a diagram showing an example dialogue box that is displayed on a CRT in FIG. 2 for setting a blank space.

FIG. 5 is a diagram showing an example blank space setup dialogue box that is displayed on the CRT 10 in FIG. 2.

In FIG. 5, CHK1 to CHK5 are check areas. A check mark is entered in the check area CHK1 when the size of a blank space to be formed, together with print data, is designated by, for example, units of lines. A check mark is entered in the check area CHK2 when the size of a blank space to be formed, together with print data, is designated by, for example, units of screens. A check mark is entered in the check area CHK3 when the orientation of a sheet is to be changed (changed from portrait to landscape, etc.). A check mark is entered in the check area CHK4 when a rule is added to a blank space to be formed. And a check mark is entered in the check area CHK5 when a square is added to a blank space that is to be formed. A data file F1 is an area wherein a line is designated by using a numerical value when the check area CHK1 is selected. And a data file F2 is an area wherein the ratio of the area occupied on an editing screen by blank space is designated when the check area CHK2 is selected. The current state corresponds to when "half (a half screen)" is designated, and a button BT is depressed to select the blank space information that is desired.

Figure 6:
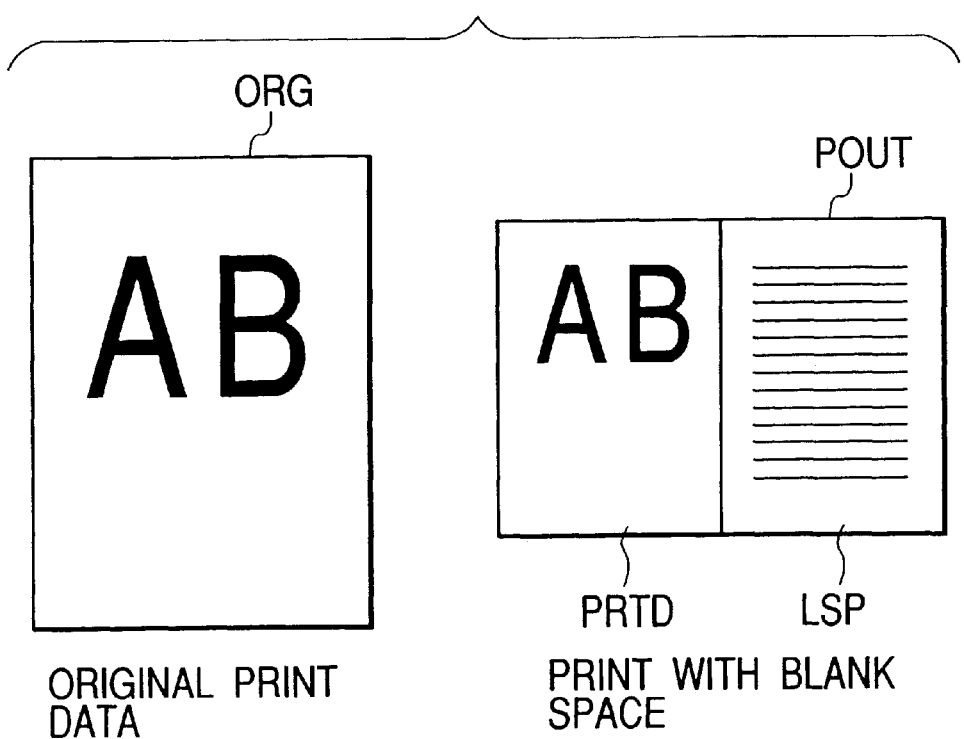
FIG. 6 is a specific diagram showing an example printed form, prepared by the data processing apparatus according to the present invention, in which print data and a blank space are combined.

FIG. 6 is a specific diagram showing example printed results, obtained by the data processing apparatus of the present invention, in which print data and a blank space are combined. These results are based on the setup prepared using the blank space information setup screen in FIG. 5, for example.

In FIG. 6, original print data ORG corresponds to a state wherein a portrait view for an A4 sized recording sheet is set as the format. The printed result POUT corresponds to a state wherein the original print data ORG are printed by changing the orientation of the A4 sheet and printing print data PRTD on one half of the face and blank information (designated by ruled lines) LSP on the other half. In this embodiment, two types of blank space processing, i.e., filling it with ruled lines or with squares, are supported by a dialogue box that is provided as blank space information acquisition means for a user. Various other forms, such as blank space that has not been processed, may be employed.

For the blank space designation method, ¼, ½ or ¾ of a recording sheet can be designated in accordance with the number of lines or the ratio of the blank space to the size of a recording sheet. The orientation of a sheet can also be changed.

In the example in FIG. 6, the orientation of the recording sheet on which original print data are printed is changed from portrait to landscape, and the printed results are provided using the landscape orientation with the drawing of ruled lines in the blank space that occupies one half of a sheet (right half in this case).

The characteristic arrangement of the present invention will now be described while referring to FIG. 3.

The data processing apparatus (host computer 3000) for transmitting print data to a printing apparatus that can communicate with the data processing apparatus via a predetermined communication medium (including a network or an interface), comprises:

blank space setup means for establishing blank space information by which to add predetermined blank space to print data (by employing the keyboard 9 or a printing device (not shown) to enter blank space parameters (the orientation of a sheet, the attributes, the positions and sizes of blank space, etc.));

calculation means (despooler 305) for calculating the magnification ratio for the print data based on the blank space information set up using the blank space setup means;

magnification means (despooler 305) for magnifying the print data at the magnification ratio obtained by the calculation means; and layout means (despooler 305) for laying out the print data magnified by the magnification means in accordance with the blank space information established by the blank space setup means. Upon receiving a printing request, print data can be freely edited by adding desired blank space to print data that are prepared by an application and by laying out the resultant print data, and the synthesized printed results according to which space for notes is added to the print data can be easily obtained by simple a operation.

The magnification means magnifies, at the magnification ratio obtained by the calculation means, intermediate code for which the print data are converted into data having a different form. Thus, print data having an optimal size can be generated in accordance with the setup for externally attached blank space, without the optimally sized print data being affected by print data generated by an application.

The blank space information is set by using units of screens or units of lines. A blank space having an appropriate size can be set for external attachment to print data that are prepared in accordance with the instructions of a user of blank space.

The blank space information is used to select a different orientation from that which has been set for a sheet for the prepared print data (see FIG. 5). The print data and a blank space can be laid out on a sheet using an orientation that differs from that used for the setup for the prepared print data.

A predetermined attribute is additionally set as the blank space information. Blank space having a different form can be externally attached to print data that have been prepared.

The predetermined attribute can be a ruled line or a square. A blank space filled with ruled lines or squares can be externally attached to print data.

Figure 9:
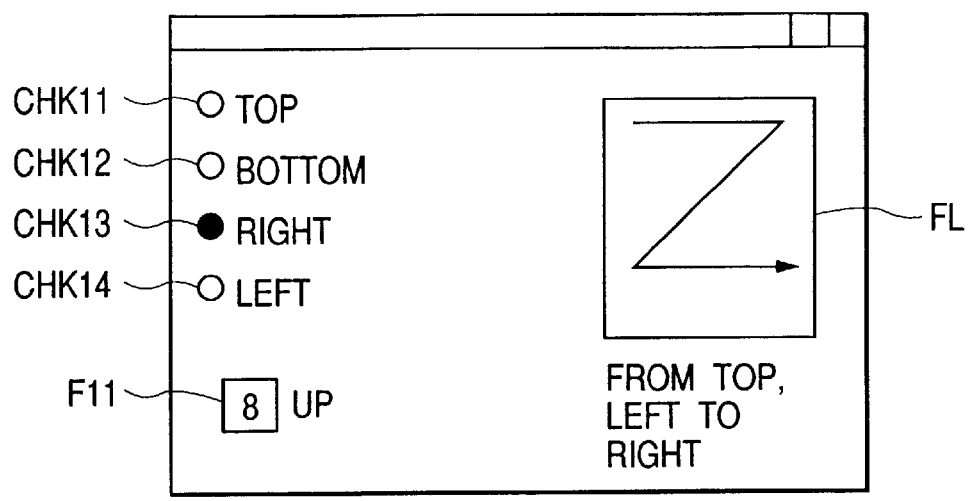
FIG. 9 is a diagram showing an example blank space information designation dialogue box for a data processing apparatus according to a second embodiment of the present invention.

The blank space setup means establishes a layout mode for laying out print data for N pages on one page (see FIG. 9). Therefore, a layout mode can be arbitrarily set in which, without depending on a function performed by an application, both a printing process for laying out print data consisting of N pages on one page and a process for externally adding blank space to print data for each page layout are performed.

When the layout mode is set by the blank space setup means, the layout means lays out blank space for N pages accompanied by N pages of reduced print data. Thus, in a layout, blank space can be externally attached to print data for N pages that have been reduced and that fit on one page, and the results whereby blank space is accompanied by Nin1 printing can be obtained.

The layout means employs a layout method for a blank page that differs from that for a normal page. Thus, a layout for blank space that differs from that provided for a normal page can be obtained for a blank page (see FIGS. 12 and 13 which will be described later).

The layout means does not add blank space as a layout for a blank page. Thus, the printing of blank space that is not required for a blank page can be prevented (see the output layout in FIG. 12. which will be described later).

The layout means processes an entirely blank page as blank space for a layout for a blank page. Thus, since the entire blank page is regarded as blank space, a larger blank space can be obtained.

The blank space setup means sets up blank space for a blank page differently from the manner in which it is set up for a normal page (see FIG. 11 which will be described later). Thus, a user can set up blank space for a blank page differently from the manner in which it is set up for a normal page.

If a process for synthesizing additional information (including character string data and image data, which will be described later) with print data in a layout and printing them together can be performed at the same time, the layout means performs a layout process for blank space in a different manner from that used for additional information for the normal print data. Thus, when additional information can be laid out together with print data, for blank space the layout of additional information that differs from a normal page can be output (see FIGS. 18 and 19, which will be described later).

If processes for synthesizing additional information with print data in a layout and for printing them together can be performed at the same time, the layout means does not add additional information to blank space in a layout. Thus, when additional information can be laid out with print data, a layout wherein additional information is not added to a blank space can be output (see FIG. 19, which will be described later).

An explanation will now be given for flowcharts in FIGS. 7 and 8 for an automatic blank space printing process performed according to the present invention by the printer driver of the data processing apparatus. The printer driver includes a dispatcher, a spooler, a spool file manager and a despooler, and is a portion that the vendor of the printer driver can provide.

Figure 7:
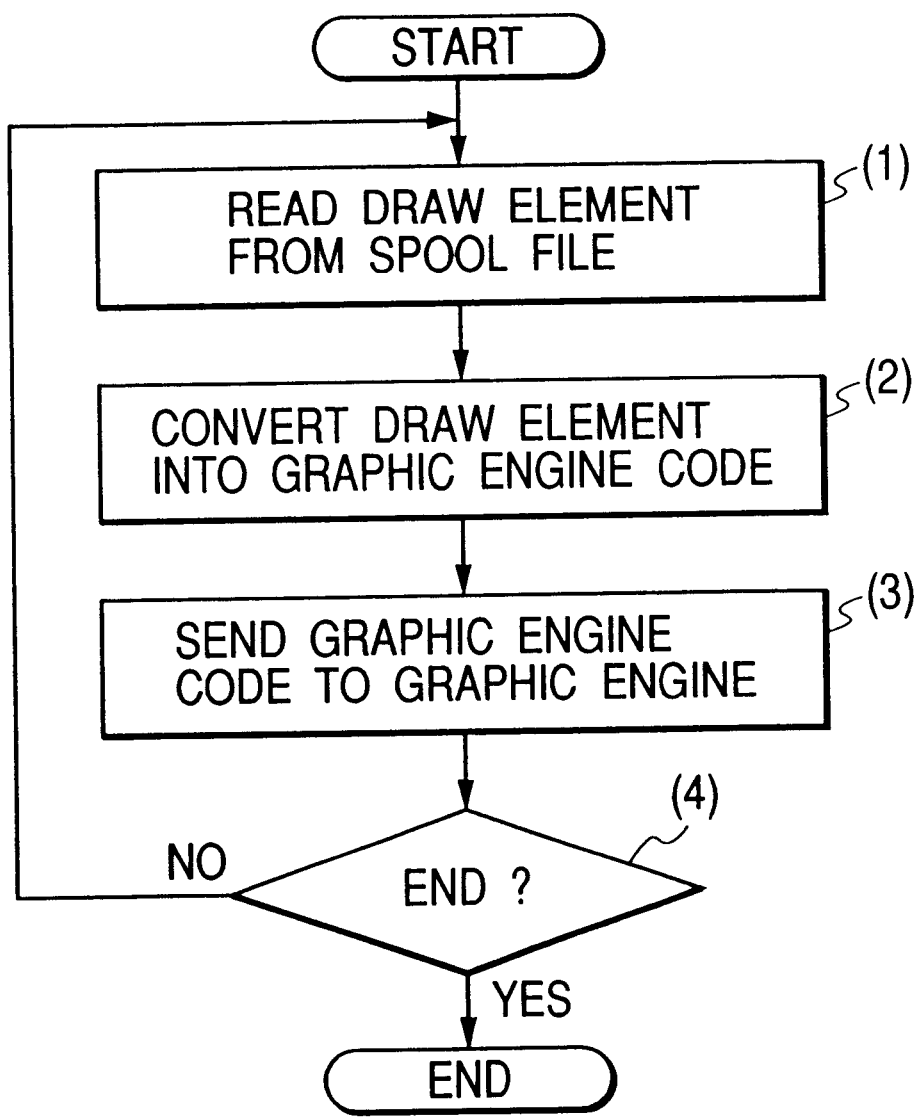
FIG. 7 is a flowchart showing first data processing performed by the data processing apparatus according to the present invention.

FIG. 7 is a flowchart showing the first data processing performed by the data processing apparatus according to the present invention. This processing corresponds to that performed when the despooler 305 processes intermediate code included in the spool file 303 in accordance with the processing setup stored in the spool file 303, and outputs the results again via the graphic engine 202. While various processes are actually performed in accordance with the process contents, the processing in FIG. 7 is a nucleus that does not depend on the process contents. (1) to (4) indicate individual steps.

First, at step (1), the spool file manager 304 reads the processing setup and input page data from the spool file 303.

The reading of data can also be changed, as needed, in accordance with the process contents or in order to optimize the printing speed or to reduce the required memory. For example, if printing in the reverse order is set as the process contents, page data are read beginning with data for the last page.

At step (2), the despooler 305 processes the input page data in accordance with the processing setup received from the spool file manager 304. When there is no special processing setup, intermediate code is simply converted into an input form for the graphic engine 202 (a drawing element is converted into a graphic engine form). In Windows (a trademark of Microsoft Corp.) the graphic engine form corresponds to a GDI function.

At step (3), the code in the input form for the graphic engine 202 is transmitted to the graphic engine 202. At step (4), a check is performed to determine whether there is still intermediate code that must be converted, i.e., whether drawing has been completed. When drawing has not been completed, program control returns to step (1). When drawing has been completed, the processing is thereafter terminated. It should be noted that variations of the process performance are present. For example, if all the intermediate codes are set to be read at one time, steps (2) and (3) are repeated for intermediate codes that are collectively read, and when all the intermediate codes have been processed, program control returns to step (1).

Figure 8:
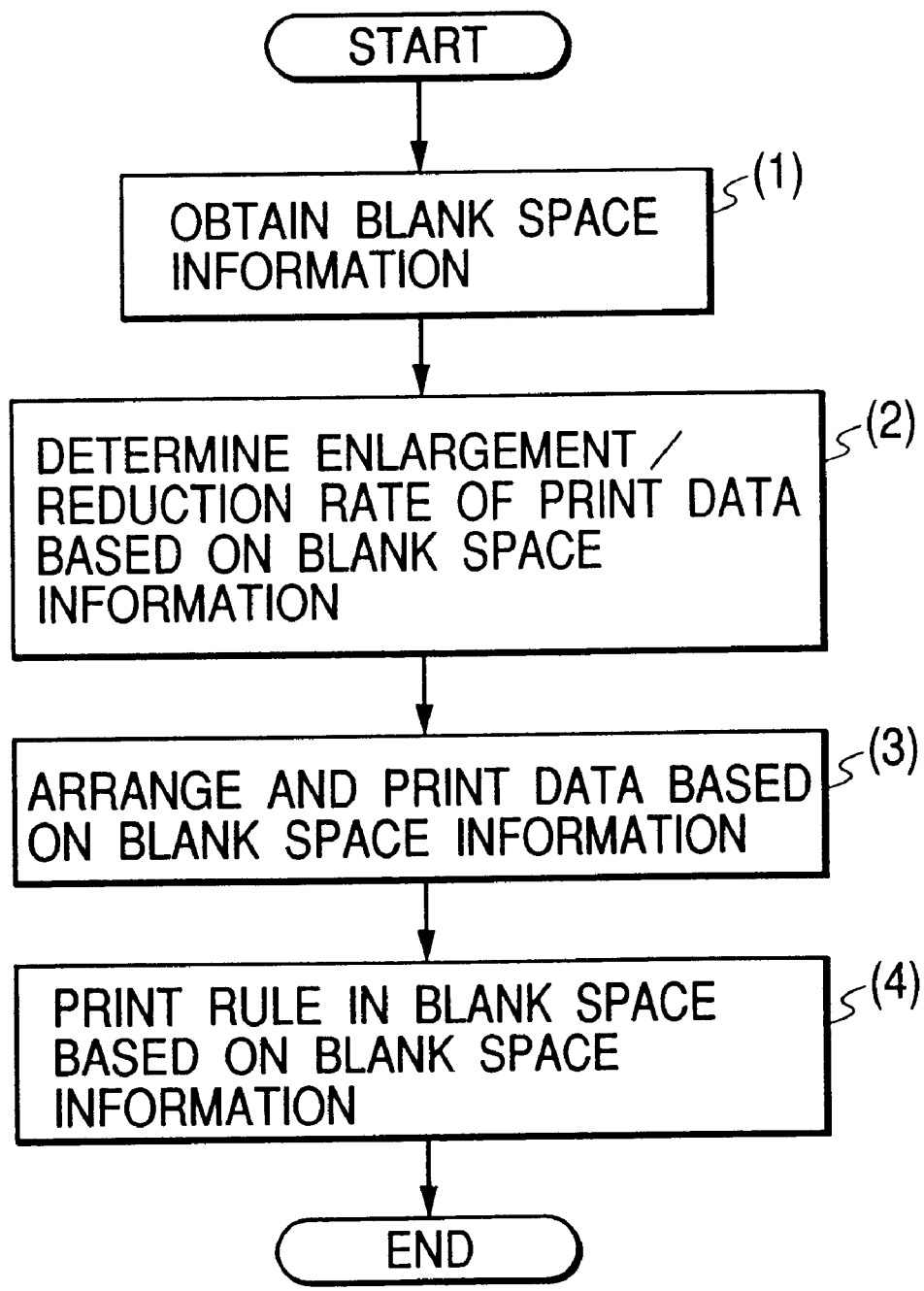
FIG. 8 is a flowchart showing second data processing performed by the data processing apparatus according to the present invention.

FIG. 8 is a flowchart showing second data processing performed by the data processing apparatus of the present invention. This processing corresponds to a detailed process at step (2) in FIG. 7. (1) to (4) indicate individual steps.

At step (1), blank space information designated on the screen in FIG. 5, i.e., blank space information, to include the position and the size of the blank space, is obtained. At step (2), the spooler file manager 304 calculates the magnification ratio for print data when blank space is set in accordance with the blank space information obtained at step (1).

In the process at step (2), the size of an area for writing print data is obtained from the size of a sheet (the available printing area of a sheet) and the size of the blank space, and based on this area the magnification ratio is calculated at which all the print data can be printed without any data being missed (without the sheet size or the available printing area for the print data being extended).

When the original print data ORG are reduced by this process, all the original print data ORG can be printed on a sheet as print data PRTD, even if blank space is provided.

At step (3), in accordance with the blank space information, the spooler 305 lays out and prints the print data that are reduced in accordance with the magnification ratio obtained by the spool file manager 304 at step (2) (print data PRTD in FIG. 6). A well known magnification technique can be applied for the magnification process.

At step (4), in accordance with the blank space information the despooler 305 also prints ruled lines, etc., in the blank space (blank space information LSP in FIG. 6). The processing is thereafter terminated.

The characteristic structure of this embodiment will now be described while referring to the flowchart in FIG. 8.

Provided are a data processing method for the data processing apparatus for transmitting print data to a printing apparatus that can communicate with the data processing apparatus via a predetermined communication medium (including a network or an interface), and a storage medium on which is stored a program that can be read by a computer for controlling a data processing apparatus that transmits print data to a printing apparatus that can communicate with the data processing apparatus via a predetermined communication medium, the method or the program comprising:

a blank space setup step (a pre-step (not shown) of step (1) in FIG. 8) of setting up blank space information for adding predetermined blank space to the print data;

a calculation step (steps (1) and (2) in FIG. 8) of calculating the magnification ratio for the print data based on the blank space information set up at the blank space setup step;

a magnification step (step (3) in FIG. 8) of reducing the print data at the magnification ratio obtained at the calculation step; and a layout step (step (3) in FIG. 8) of laying out the print data reduced at the magnification step in accordance with the blank space information set up at the blank space setup means. Upon receiving a printing request, print data can be freely edited by adding desired blank space to print data that have been prepared by an application and by laying out the resultant print data, and the synthesized printed results according to which space for notes is added to the print data can be easily obtained by a simple operation.

At the magnification means, intermediate code for which the print data are converted into data having a different form is magnified at the magnification ratio obtained at the calculation step. Thus, print data having an optimal size can be generated in accordance with the setup for externally attached blank space, without the optimally sized print data being affected by print data generated by an application.

The blank space information is set by using units of screens or units of lines, as is shown in FIG. 5. A blank space having an appropriate size can be set for external attachment to print data that are prepared in accordance with the instructions of a user of blank space.

The blank space information is used to select a different orientation from that which has been set for a sheet for the prepared print data (see FIG. 5). The print data and a blank space can be laid out on a sheet using an orientation that differs from that used for the setup for the prepared print data.

A predetermined attribute is additionally set as the blank space information. Blank space having a different form can be externally attached to print data that have been prepared.

The predetermined attribute can be a ruled line or a square, as is shown in FIG. 5. A blank space filled with ruled lines or squares can be externally attached to print data.

At the blank space setup step, a layout mode for laying out print data for N pages on one page is established (see FIG. 9). Therefore, a layout mode can be arbitrarily set in which, without depending on a function performed by an application, both a printing process for laying out print data consisting of N pages on one page and a process for externally adding blank space to print data for each page layout are performed.

Figure 10:
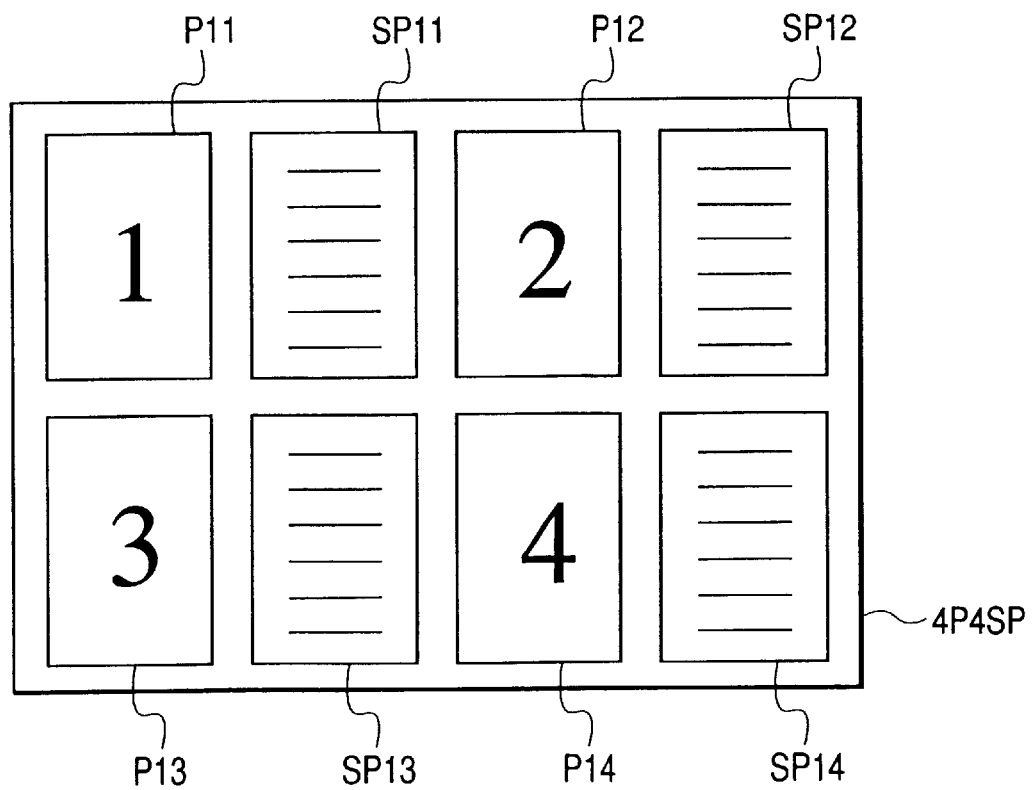
FIG. 10 is a specific diagram showing an example printed form based on the setup for the blank space information designation dialogue box in FIG. 9.

When the layout mode is set at the blank space setup step, at the layout step, a blank space is laid out for N pages accompanied by N pages of reduced print data (see FIG. 10). Thus, in a layout, blank space can be externally attached to print data for N pages that have been reduced and that fit on one page, and the results whereby blank space is accompanied by Nin1 printing can be obtained.

Second Embodiment

In the first embodiment, blank space is synthesized with the print data for one page and the two are printed together in accordance with the blank space information designated by a user. The so-called Nin1 printing function, whereby data for a plurality of pages are printed in the printing space provided for a single page, and the above described blank space printing may be employed together to print blank space on each of the pages that are allocated on a sheet intended for a single page. This arrangement will now be employed in a description given for a second embodiment.

FIG. 9 is a diagram showing an example blank space information designation dialogue box used by the data processing apparatus according to the second embodiment of the present invention.

In FIG. 9, CHK11 to CHK14 are blank space position marks. When the blank space position mark CHK11 is selected, the printing of blank space at the top of the original print data is designated. When the blank space position mark CHK12 is selected, the printing of blank space at the bottom of the original print data is designated. When the blank space position mark CHK13 is selected, the printing of blank space to the right of the original print data is designated. And when the blank space position mark CHK14 is selected, the printing of blank space to the left of the original print data is designated.

A field F11 is a box in which the number of pages to be formed is entered. To print blank space with the original print data for four pages, two times four, i.e., the numeral "8", is entered. FL indicates the direction in which the pages and the blank spaces are arranged, and currently, the set direction extends from the top left to the right.

FIG. 10 is a specific diagram showing the printed results based on the setup in the blank space information designation dialogue box in FIG. 9. Blank spaces and N pages, where N is an even number, are alternately entered.

In FIG. 10, P11 to P14 designate original print data areas that are printed at ⅛ their normal size. And SP11 to SP14 designate blank space areas that correspond respectively to the original print data areas P11 to P14. Rules are designated for each blank space area. An explanation will now be given for the printing performed when both N page printing and blank space printing are combined.

If "8" is entered in the box F11 in the dialogue box in FIG. 9 (called "8 up"), in the overall layout in FIG. 9, the right side of a page is used as a margin, and the entire arrangement begins at the top left and moves to the right. The results of the printing performed in accordance with this setup are as is shown in FIG. 10. Various other layouts can be employed, depending on how the blank pages are arranged, and accordingly, various user interfaces for setting blank space information can be employed.

As one example variation for the second embodiment, only one of 4 up pages is regarded as a blank space, and print data for three pages and one blank space can be printed on a single sheet.

Further, to combine N pages and blank spaces in the printed layout, the second embodiment includes a method for thinning several of the N pages and employing the thinned portions as blank spaces; a method for thinning columns and rows, when N=m*n, to obtain a space, and for changing 3*3 in, for example, a setup for 9 up to 2*3 and for employing the remaining space for one row as a blank space in the layout; a method for forming one blank space and for printing N pages in the remaining space; or a method for regarding, as a new one-page data, the above described (print data+blank space) printed on one sheet, and for arranging this data set so that it can be used for N pages.

Third Embodiment

In the above embodiments, blank space information is synthesized and printed. However, a special blank space process may be performed in accordance with an existing condition. This process will now be employed in a description given for a third embodiment.

Figure 11:
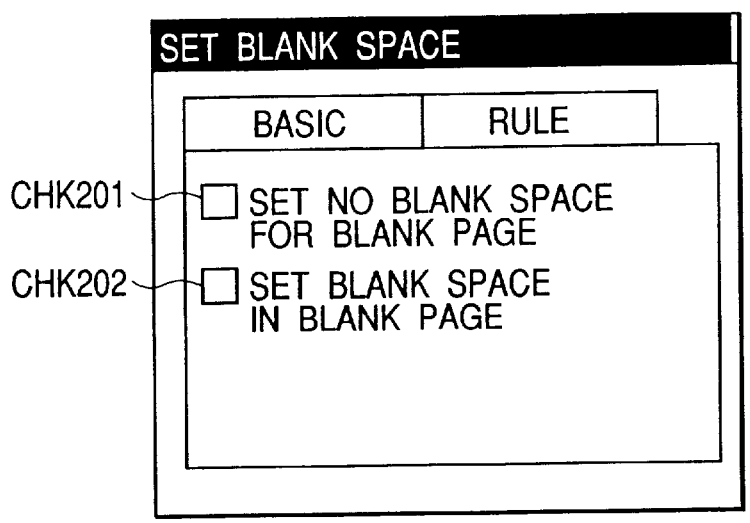
FIG. 11 is a diagram showing an example blank space information designation dialogue box for a data processing apparatus according to a third embodiment of the present invention.

FIG. 11 is a diagram showing an example blank space information setup dialogue box for a data processing apparatus according to the third embodiment of the present invention. A blank page is defined as follows.

A blank page that is virtually assumed to exist on a sheet, even though an actual page is not present thereon, is defined as a blank page. For example, such a blank page includes a portion wherein the actual data are less than those for N pages in N-page printing, e.g., a fourth page whereon, for three-page data, print data are not actually present in the four-page printing, or a reversed page whereon, in double-side printing, print data are present only on the obverse side.

In FIG. 11, CHK201 and CHK202 are used for the special designation of a blank page. When CHK201 is selected, a blank space is not set for a blank page. When CHK202 is selected, however, a large blank space is set that covers the entire blank page.

Figure 12:
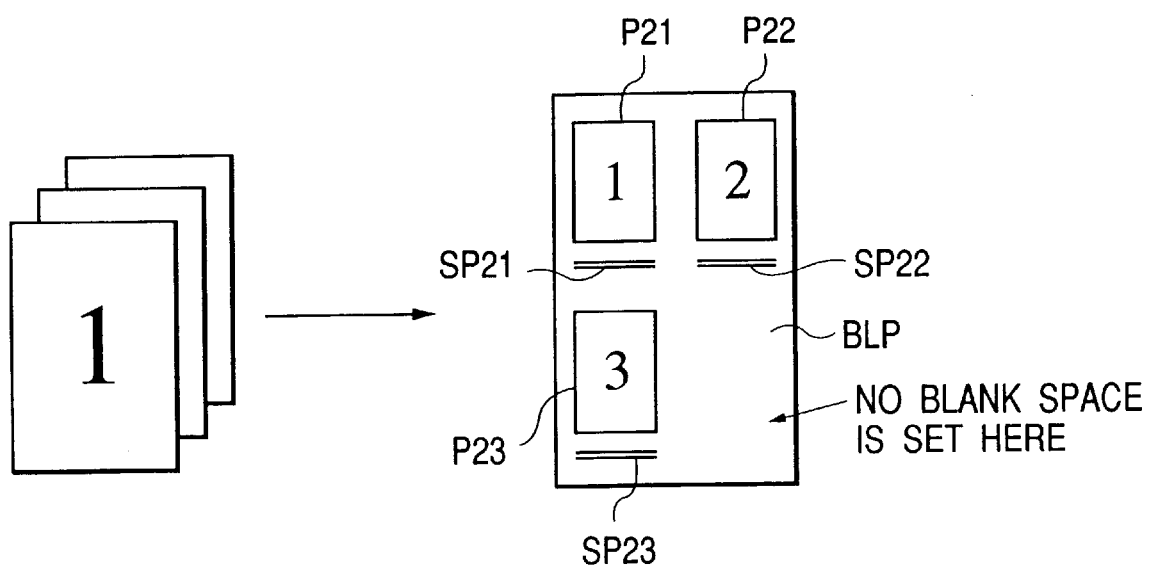
FIG. 12 is a specific diagram showing an example printed form based on the setup for the blank space information designation dialogue box in FIG. 11.

FIG. 12 is a specific diagram showing printing results based on the setup designated using the blank space information setup dialogue box in FIG. 11. In this example, in the process for printing on a single sheet print data for N pages, relative to the individual pages (logical pages), no blank space is set for a blank page in the layout for a single sheet. This example corresponds to the state wherein, in four-page printing, blank spaces SP21 to SP23 containing ruled lines are set for logical pages P21 to P23.

In FIG. 12, BLP indicates a blank page. Since a three-page document is printed in the space for four pages, one of the four segments is a blank page (a logical page does not exist), and blank space information for pages 1 to 3 is not printed for the blank page BLP.

Figure 13:
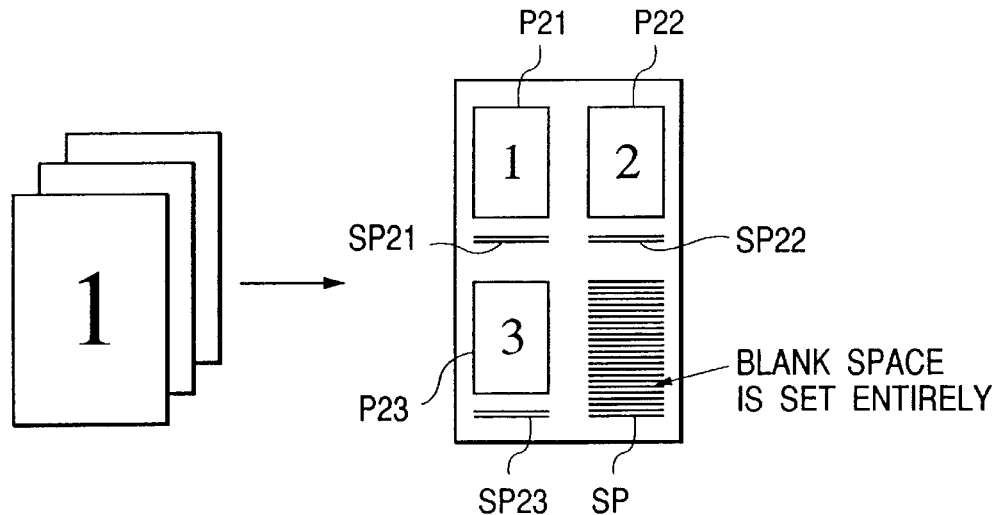
FIG. 13 is a specific diagram showing an example printed form based on the setup for the blank space information designation dialogue box in FIG. 11.

FIG. 13 is a specific diagram illustrating the printed results based on the setup designated using the blank space setup dialogue box in FIG. 11. In the printing process for laying out print data for N pages on one sheet, a blank space is set for a blank page relative to pages (called logical pages) laid out on a single page. In this example, in four-page printing, blank spaces SP21 to SP23 containing ruled lines are set for logical pages P21 to P23.

In FIG. 13, SP indicates a blank space. Since a three-page document is printed in the space for four pages, one of the four areas is a blank page (a logical page is not present), and on the blank page, the ruled lines printed for pages 1 to 3 are used to fill the entire blank space SP.

Figure 14:
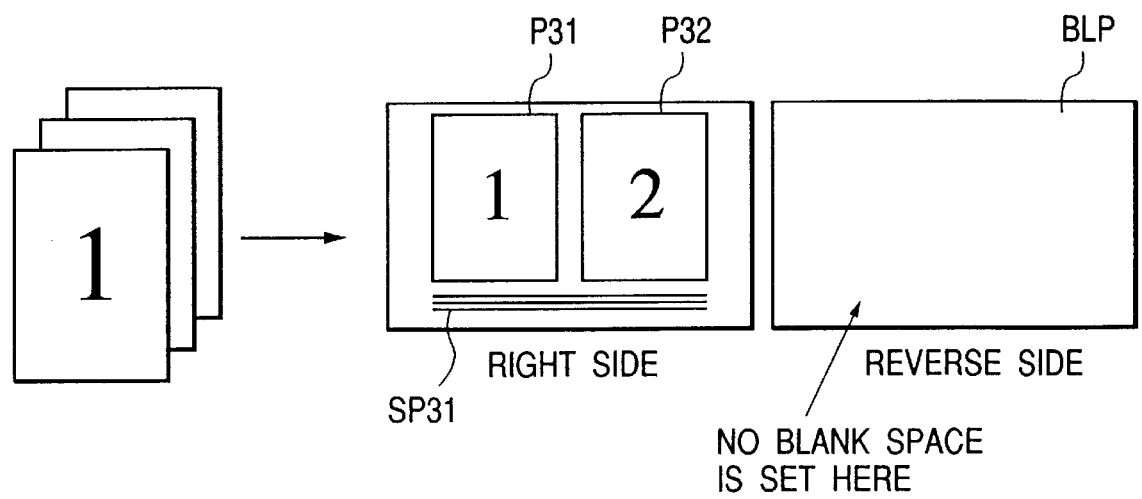
FIG. 14 is a specific diagram showing an example printed form based on the setup for the blank space information designation dialogue box in FIG. 11.

FIG. 14 is a specific diagram showing printed results based on the setup designated using the blank space information setup dialogue box in FIG. 11. A blank space for rules is set for a sheet. In this example, since there are only two pages of print data, there is no print data available for the reverse side of the sheet in two-page printing and double-sided printing, and therefore, a blank space is not printed on the reverse side.

In FIG. 14, P31 and P32 are logical pages, and SP31 is a blank space and is printed on the obverse side of the sheet. BLP is a blank page, and is not changed since there is no data to be printed on it.

Since with this process no data is printed on the reverse side of the sheet, a system regards this operation as a one-sided printing process, and the processing time can be reduced.

Figure 15:
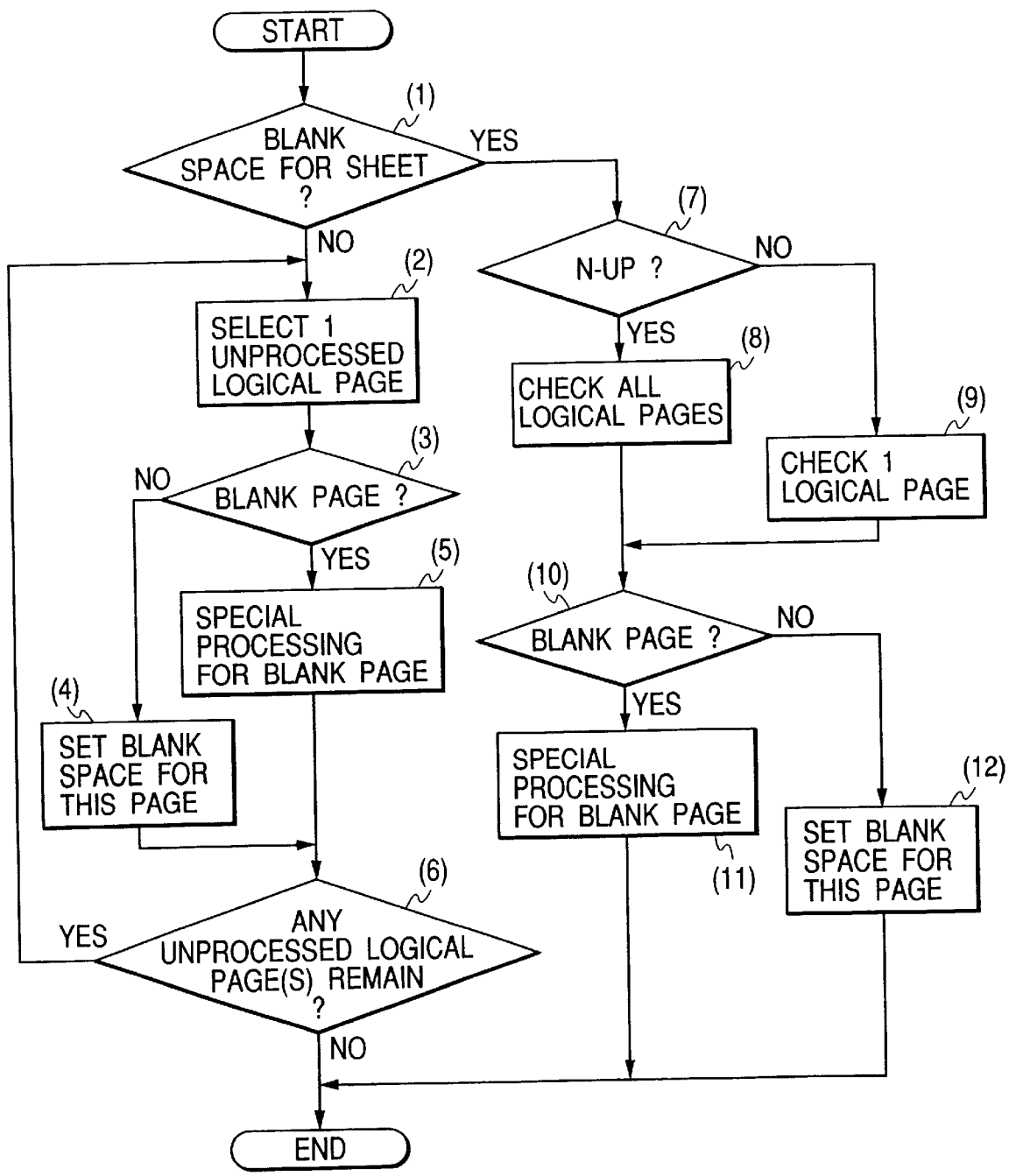
FIG. 15 is a flowchart showing third data processing performed by the data processing apparatus according to the present invention.

FIG. 15 is a flowchart showing the third data processing that is performed by the data processing apparatus according to the present invention. The entries (1) to (12) designate steps.

First, at step (1), a check is performed to determine whether a blank space has been set for a sheet. If a blank space has not been set for each logical page on a sheet, program control advances to step (2) whereat one target logical page is selected from among those on the sheet. At step (3), a check is performed to determine whether the selected logical page is a blank page. If the logical page is not a blank page, at step (4), the normal blank space process is performed, and program control moves to step (6). As a result, as is shown in FIG. 13, in an area wherein a logical page is to be printed, lines are drawn that have a width and an interval in consonance with the setup designated for a blank space.

When at step (3) the selected logical page is a blank page, at step (5) a special process for a blank page is performed. As a result, as is shown in FIG. 12, a blank space is not printed adjacent to an area that is to be processed as a blank page wherein a logical page is not to be printed.

At step (6), a check is performed to determine whether all the logical pages on a physical page have been processed.

When all of the logical pages have not been processed, program control returns to step (2) and the above process is repeated.

When all the logical pages on a physical page have been processed, the processing is terminated.

When, at step (1), a blank space is set for a sheet, at step (7), a check is performed to determine whether N-page printing has been designated. If N-page printing has been designated, program control moves to step (8), whereat all the logical pages on a sheet are examined. At step (10), a check is performed to determine whether the pertinent sheet is a blank page. When the sheet is determined to be a blank page, at step (11), a special blank space process for a blank page is performed, and the processing is thereafter terminated.

If, at step (10), it is ascertained that the sheet is not a blank page, at step (12), the normal blank space process is performed, and the processing is thereafter terminated.

If it is ascertained at step (7) that N-page printing has not been designated, at step (9) one logical page to be printed on a sheet is examined to determine whether the sheet is to be a blank page. Program control then moves to step (10).

According to the third embodiment, "whether the sheet is a blank page or not" is used as a reference for the performance of a special process. For this, "not printing a blank space" or "processing a blank page as a blank space" is employed as an example special process. However, the function of the present invention can be carried out for the other embodiments.

The layout step in this embodiment will now be described while referring to the flowchart in FIG. 15.

In the above structured data processing apparatus, the layout step (steps (1) to (12) in FIG. 15) employs a layout method (see FIGS. 12 and 13) for a blank page that differs from a normal page. Thus, the layout for a blank space that differs from that for a normal page can be provided for a blank page.

At the layout step, the layout indicates that a blank space is not added for a blank page. Thus, the unnecessary printing of a blank space for a blank page can be prevented.

Since at the layout step, a blank space (see FIG. 14) is not set for a whole blank page as a layout, a larger blank space can be obtained.

Since at the blank space setup step, a blank space can be set for a blank page differently from one set for a normal page, a blank space can be set that is desired by a user, i.e., an unnecessary blank space is not set.

Fourth Embodiment

In the above embodiments, blank space information is set for printed data. However, the above blank space printing may be performed at the same time as additional data, such as data for the specific character string "Confidential" shown in FIG. 16 or image data, are to be printed with original print data. This process will now be employed in a description given for a fourth embodiment.

FIG. 17 is a diagram showing an example blank space information setup dialogue box for a data processing apparatus according to the fourth embodiment of the present invention.

In FIG. 17, to indicate that additional information is to be printed in a blank space, a check mark is entered in a box CHK301.

Figure 18:
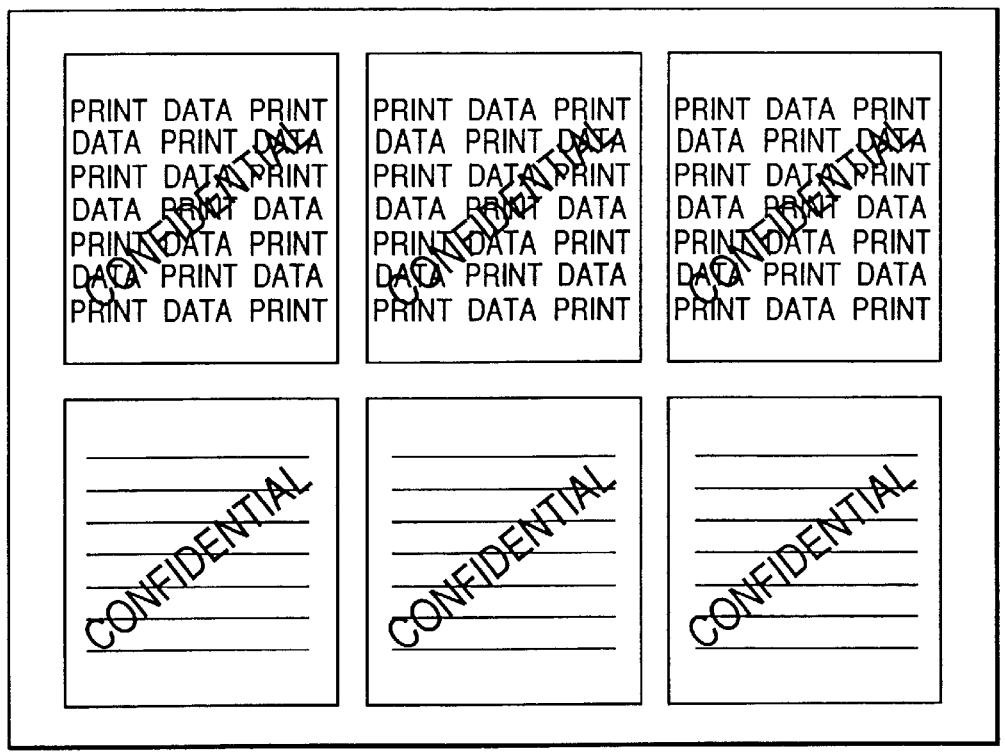
FIG. 18 is a specific diagram showing a printed example based on the setup for the blank space information designation dialogue box in FIG. 17.
Figure 19:
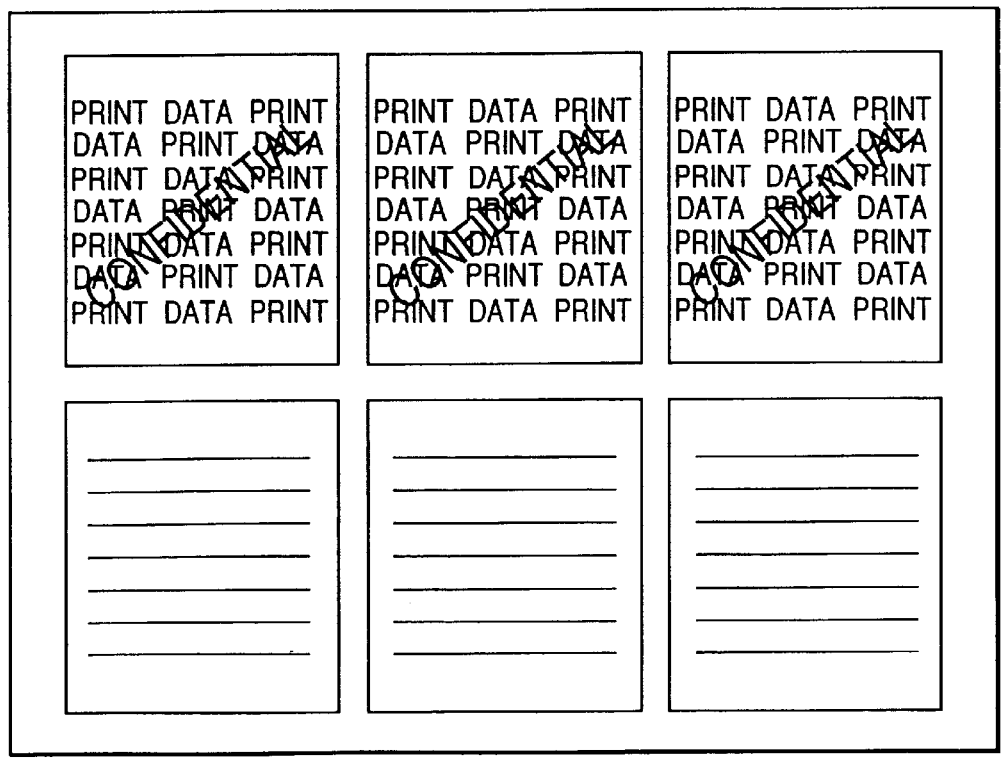
FIG. 19 is a specific diagram showing a printed example based on the setup for the blank space information designation dialogue box in FIG. 17.

FIGS. 18 and 19 are specific diagrams showing printed results based on the blank space information setup dialogue in FIG. 17. The example in FIG. 18 corresponds to the results obtained when a check mark is entered in the box CHK301. Because additional information is entered in the blank spaces, they are not in an appropriate condition to be used for taking notes. The example in FIG. 19 corresponds to the results obtained when a check mark is not entered in the box CHK301 and additional information is not printed in the blank spaces.

Figure 20:
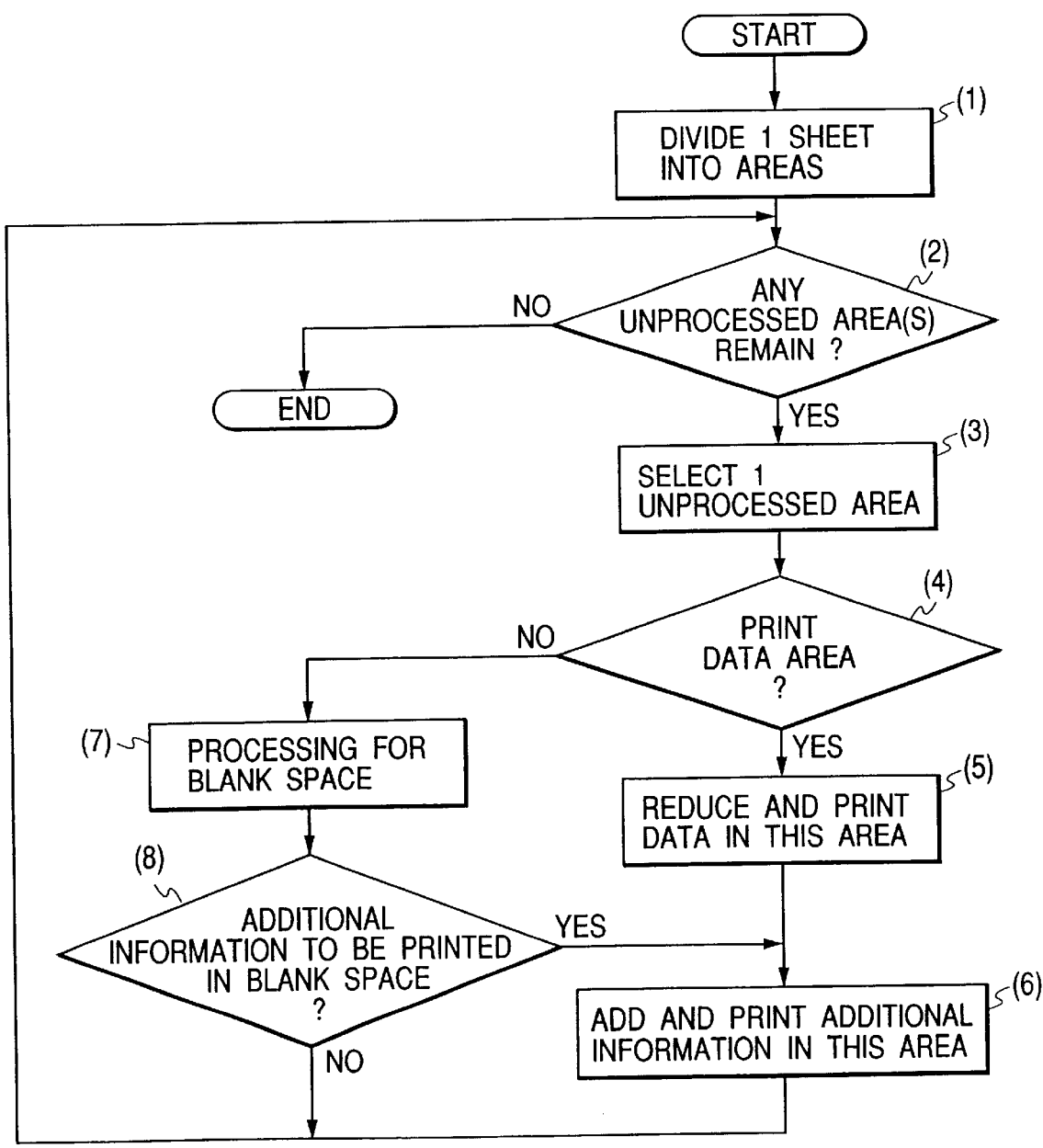
FIG. 20 is a flowchart showing fourth data processing performed by the data processing apparatus according to the present invention.

FIG. 20 is a flowchart showing fourth data processing performed by the data processing apparatus of the present invention. The entries (1) to (8) designate individual steps.

At step (1), a sheet is divided into areas, and at step (2) a check is performed to determine whether all the areas have been processed, i.e., whether any unprocessed areas remain. When all the areas have been processed, the processing is thereafter terminated.

When, at step (2), there are areas that have not been processed, at step (3), one of the unprocessed areas is selected. At step (4), a check is performed to determine whether the selected area is a print data area or a blank space. If the selected area is a print data area, program control moves to step (5), whereat characters to be printed are reduced in size and the reduced characters are printed in the pertinent area. At step (6), additional information is printed in that area and program control then returns to step (2).

If, at step (4), the selected area is a blank space, at step (7) ruled lines are printed as part of the blank space process. Then, at step (8), a check is performed to determine whether the function for the printing of additional information in blank spaces has been set. If the printing of additional information has been set, program control moves to step (6), whereat additional information is printed in the pertinent area. After the printed results shown in FIG. 18 have been obtained, program control returns to step (2).

When, at step (8), the function for the printing of additional information in blank spaces has not been is not set, program control skips step (6) and returns to step (2) to perform the next process.

It should be noted that a system for automatically changing the setup by referring to the attributes or to the contents of additional information, without requiring a user to select the printing of additional information in blank spaces, and a system for performing only a process whereby additional information is not printed in blank spaces fall within the scope of the present invention.

The layout step in this embodiment will now be described while referring to the flowchart in FIG. 20.

In the above described data processing apparatus, if a process for synthesizing additional information with print data in a layout and for printing them together can be performed at the same time, at the layout step a layout process (see the output for a layout in FIGS. 18 and 19) for a blank space is performed in a different manner than is that for the additional information for normal print data. Thus, for a blank space, a layout for additional information can be output that differs from one for a normal page.

If a process for synthesizing additional information with print data in a layout and for printing them together can be performed at the same time, at the layout step the additional information is not added to a layout for a blank space. Thus, a layout can be output wherein additional information is not added for a blank space.

An explanation will now be given, while referring to a memory map in FIG. 21, for the structure of a data processing program that can be read by a printing system for which the data processing apparatus of the present invention can be applied.

FIG. 21 is a diagram for explaining the memory map for a storage medium on which various data processing programs are stored that can be read by a printing system for which the data processing apparatus of the present invention can be applied.

Although not specifically shown, in addition to a group of programs, information, such as version information and the names of creators, for managing the programs is also stored on the storage medium, as is information associated with an OS that reads a program, e.g., an icon for identifying and displaying a program.

Further, data for various programs are also managed by the above directory. And in addition, a program for installing various programs in a computer, and a program for decompressing programs that have been installed are also stored on the storage medium.

The functions shown in FIGS. 7, 8, 15 and 20 may, according to the embodiments, be implemented by a host computer in accordance with a program that is externally installed. In this case, the present invention can be applied when an information group that includes a program is obtained from a storage medium, such as a CD-ROM, a flash memory or an FD, or from an external storage medium across a network, and is supplied to an output device.

Further, software program code for implementing the functions in the previous embodiments may be supplied to a computer in an apparatus or in a system, and in consonance with the program, the computer (or a CPU or an MPU) in the system or in the apparatus may read and execute program code obtained from the storage medium to accomplish the objective of the present invention.

In this case, the program code read from the storage medium accomplishes the innovative function of the present invention, and the storage medium on which such program code is recorded constitutes the present invention.

A storage medium for supplying such program code can be, for example, a floppy disk, a hard disk, an optical disk, a magneto-optical disk, a CD-ROM, a CD-R, a magnetic tape, a nonvolatile memory card, a ROM, or an EEPROM.

In addition, the present invention includes not only the case where the functions in the previous embodiments can be performed when program code is read and executed by the computer, but also the case where, in accordance with an instruction in the program code, an OS (Operating System) running on the computer performs a part, or all of the actual processing.

Furthermore, the present invention includes the case where program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs a part, or all of the actual processing in order to implement the functions included in the above described embodiments.

As is described above, according to the present invention, upon receiving a printing request, print data can be freely edited by adding desired blank space to print data that are prepared by an application and by laying out the resultant print data, and the synthesized printed results according to which space for notes is added to the print data can be easily obtained by simple an operation.

Further, print data having an optimal size can be generated in accordance with the setup for externally attached blank space, without the optimally sized print data being affected by print data generated by an application.

Since the blank space information is set by using units of screens or units of lines, a blank space having an appropriate size can be set for external attachment to print data that are prepared in accordance with the instructions of a user of blank space.

The blank space information is used to select a different orientation from that which has been set for a sheet for the prepared print data. Thus, the print data and a blank space can be laid out on a sheet using an orientation that differs from that used for the setup for the prepared print data.

Furthermore, since a predetermined attribute is additionally set as the blank space information, blank space having a different form can be externally attached to print data that have been prepared.

Since the predetermined attribute is a ruled line or a square, a blank space filled with ruled lines or squares can be externally attached to print data.

The blank space setup means can establish a layout mode for laying out print data for N pages on one page. Therefore, a layout mode can be arbitrarily set in which, without depending on an application, both a printing process for laying out print data consisting of N pages on one page and a process for externally adding blank space to print data for each page layout are performed.

When the layout mode is set by the blank space setup means, the layout means lays out blank space for N pages accompanied by N pages of reduced print data. Thus, in a layout, blank space can be externally attached to print data for N pages that have been reduced and that fit on one page, and the results whereby blank space is accompanied by Nin1 printing can be obtained.

Furthermore, since there is also included a transmission step of transmitting, to the printing apparatus, print data and a blank space added in a layout at the layout step, the print data and the added blank space in the layout can be printed.

The layout means employs a layout method for a blank page that differs from that for a normal page. Thus, a layout for blank space that differs from that provided for a normal page can be obtained for a blank page.

The layout means does not add blank space as a layout for a blank page. Thus, the printing of blank space that is not required for a blank page can be prevented.

The layout means processes an entirely blank page as blank space for a layout for a blank page. Thus, since the entire blank page is regarded as blank space, a larger blank space can be obtained.

The blank space setup means sets up blank space for a blank page differently from the manner in which it is set up for a normal page. Thus, a user can set up blank space for a blank page differently from the manner in which it is set up for a normal page.

If a process for synthesizing additional information with print data in a layout and printing them together can be performed at the same time, the layout means performs a layout process for blank space in a different manner from that used for additional information for the normal print data. Thus, when additional information can be laid out together with print data, for blank space the layout of additional information that differs from a normal page can be output.

If processes for synthesizing additional information with print data in a layout and for printing them together can be performed at the same time, the layout means does not add additional information to blank space in a layout. Thus, when additional information can be laid out with print data, a layout wherein additional information is not added to a blank space can be output.

The layout step employs a layout method for a blank page that differs from a normal page. Thus, the layout for a blank space that differs from that for a normal page can be provided for a blank page.

At the layout step, the layout indicates that a blank space is not added for a blank page. Thus, the unnecessary printing of a blank space for a blank page can be prevented.

Since at the layout step, a blank space is not set for a whole blank page as a layout, a larger blank space can be obtained.

Since, at the blank space setup step, a different setup from that for a normal page can be provided for a blank page, a blank space desired by a user can be set.

Since at the blank space setup step, a blank space can be set for a blank page differently from one set for a normal page, a blank space can be set that is desired by a user.

If a process for synthesizing additional information with print data in a layout and for printing them together can be performed at the same time, at the layout step a layout process for a blank space is performed in a different manner than is that for the additional information for normal print data. Thus, for a blank space, a layout for additional information can be output that differs from one for a normal page.

If a process for synthesizing additional information with print data in a layout and for printing them together can be performed at the same time, at the layout step the additional information is not added to a layout for a blank space. Thus, a layout can be output wherein additional information is not added for a blank space.

Therefore, a blank space having a desired form can be externally attached to print data in a layout, without depending on a function performed by an application, and the resultant print data can be transmitted to a printing apparatus. Thus, a printing environment wherein a blank space can be externally attached to print data at a printer driver level can be prepared as desired.

What is claimed is:

1. An information processing apparatus, for employing drawing data received from an application to generate print data that are to be output to a printing apparatus, comprising:

blank space setting means for preparing blank space information for adding desired blank space to said drawing data;

processing means for calculating a magnification ratio for said drawing data based on said blank space information that is set by said blank space setting means and using said magnification ratio to change the size of said drawing data; and layout means for laying out drawing data, obtained by said processing means, in accordance with said blank space information prepared by said blank space setting means, and for generating print data.

2. An information processing apparatus according to claim 1, wherein said processing means magnifies, at said magnification ratio, intermediate code for which said drawing data are converted into data having a different form.

3. An information processing apparatus according to claim 1, wherein said blank space information is set by using units of screens or units of lines.

4. An information processing apparatus according to claim 1, wherein said blank space information is used to select a different orientation from that which has been set for a sheet for said prepared drawing data.

5. An information processing apparatus according to claim 1, wherein a predetermined attribute is additionally set as said blank space information.

6. An information processing apparatus according to claim 5, wherein said predetermined attribute is a ruled line or a square.

7. An information processing apparatus according to claim 1, wherein said blank space setup means establishes a layout mode for laying out drawing data for N pages on one page.

8. An information processing apparatus according to claim 1, wherein, when said layout mode is set by said blank space setup means, said layout means lays out blank space for N pages accompanied by N pages of reduced drawing data.

9. An information processing apparatus according to claim 1, wherein said layout means does not add blank space as a layout for a blank page.

10. An information processing apparatus according to claim 1, wherein said layout means processes an entirely blank page as blank space for a layout for a blank page.

11. An information processing apparatus according to claim 1, further comprising:

addition means for providing additional information for drawing data; and additional information setup means either for setting up for the printing of said additional information in a blank space, or for not setting up for the printing of said additional information in a blank space, wherein, when printing of said additional information in a blank space is set up by said additional information setup means, said layout means permits said addition means to add said additional information to a logical page on which drawing data are printed, and to not provide said additional information for said blank space.

12. An information processing method, for employing drawing data received from an application to generate print data that are to be output to a printing apparatus, comprising:

a blank space setting step of preparing blank space information for adding desired blank space to said drawing data;

a processing step of calculating a magnification ratio for said drawing data based on said blank space information that is set at said blank space setting step and using said magnification ratio to change the size of said drawing data; and a layout step of laying out drawing data, obtained at said processing step, in accordance with said blank space information prepared at said blank space setting step, and of generating print data.

13. An information processing method according to claim 12, wherein at said processing step, intermediate code for which said drawing data are converted into data having a different form is magnified at said magnification ratio.

14. An information processing method according to claim 12, wherein said blank space information is set by using units of screens or units of lines.

15. An information processing method according to claim 12, wherein said blank space information is used to select a different orientation from that which has been set for a sheet for said prepared drawing data.

16. An information processing method according to claim 12, wherein a predetermined attribute is additionally set as said blank space information.

17. An information processing method according to claim 16, wherein said predetermined attribute is a ruled line or a square.

18. An information processing method according to claim 12, wherein a layout mode for laying out drawing data for N pages on one page is established at said blank space setup step.

19. An information processing method according to claim 12, wherein, when said layout mode is set at said blank space setup step, a layout of blank space for N pages accompanied by N pages of reduced drawing data is set at said layout step.

20. An information processing method according to claim 12, wherein, at said layout step, blank space is not added as a layout for a blank page.

21. An information processing method according to claim 12, wherein, at said layout step, an entirely blank page is processed as blank space for a layout for a blank page.

22. An information processing method according to claim 11, further comprising:

an addition step of providing additional information for drawing data; and an additional information setup step either of setting up for the printing of said additional information in a blank space, or of not setting up for the printing of said additional information in a blank space, wherein, when printing of said additional information in a blank space is set up at said additional information setup step, at said layout step, said additional information is added to a logical page on which drawing data are printed, and said additional information is not provided for said blank space.

23. A computer-readable storage medium for storing a printer driver program for generating print data interpretable by a printing apparatus, said printer driver program comprising:

a blank space setting step of preparing blank space information for adding desired blank space to said drawing data;

a processing step of calculating a magnification ratio for said drawing data based on said blank space information that is set at said blank space setting step and using said magnification ratio to change the size of said drawing data; and a layout step of laying out drawing data, obtained at said processing step, in accordance with said blank space information prepared at said blank space setting step, and of generating print data.

24. A storage medium according to claim 23, wherein at said processing step, intermediate code for which said drawing data are converted into data having a different form is magnified at said magnification ratio.

25. A storage medium according to claim 23, wherein said blank space information is set by using units of screens or units of lines.

26. A storage medium according to claim 23, wherein said blank space information is used to select a different orientation from that which has been set for a sheet for said prepared drawing data.

27. A storage medium according to claim 23, wherein a predetermined attribute is additionally set as said blank space information.

28. A storage medium according to claim 27, wherein said predetermined attribute is a ruled line or a square.

29. A storage medium according to claim 23, wherein a layout mode for laying out drawing data for N pages on one page is established at said blank space setup step.

30. A storage medium according to claim 23, wherein, when said layout mode is set at said blank space setup step, a layout of blank space for N pages accompanied by N pages of reduced drawing data is set at said layout step.

31. A storage medium according to claim 23, wherein said printer driver program further comprises:

a transmission step of transmitting, to said printing apparatus, print data and a blank space added in a layout at the layout step.

32. A storage medium according to claim 23, wherein, at said layout step, blank space is not added as a layout for a blank page.

33. A storage medium according to claim 23, wherein, at said layout step, an entirely blank page is processed as blank space for a layout for a blank page.

34. A storage medium according to claim 23, wherein said printer driver program further comprises:

an addition step of providing additional information for drawing data; and an additional information setup step either of setting up for the printing of said additional information in a blank space, or of not setting up for the printing of said additional information in a blank space, wherein, when printing of said additional information in a blank space is set up at said additional information setup step, at said layout step, said additional information is added to a logical page on which drawing data are printed, and said additional information is not provided for said blank space.

* * * * *

UNITED STATES PATENT AND TRADEMARK OFFICE
CERTIFICATE OF CORRECTION

PATENT NO.     : 6,411,400 B1
DATED          : June 25, 2002
INVENTOR(S)    : Yasuo Mori It is certified that error appears in the above-identified patent and that said Letters Patent is hereby corrected as shown below:

Column 7,
Line 15, "printed" should read -- printed on --.

Column 9,
Line 13, "simple a" should read -- a simple --.

Column 11,
Line 27, "well known" should read -- well-known --.

Column 12,
Line 4, "optimally sized" should read -- optimally-sized --.

Column 13,
Line 59, "side" should read -- sided --.

Column 17,
Line 67, "simple an" should read -- a simple --.

Column 18,
Line 3, "optimally sized" should read -- optimally-sized --.

Column 20,
Line 35, "to not" should read -- not to --.

Signed and Sealed this

Twenty-fifth Day of February, 2003

JAMES E. ROGAN
*Director of the United States Patent and Trademark Office*